(12) United States Patent
Song et al.

(10) Patent No.: US 7,604,771 B2
(45) Date of Patent: Oct. 20, 2009

(54) THERMAL METHOD FOR FABRICATING A HYDROGEN SEPARATION MEMBRANE ON A POROUS SUBSTRATE

(75) Inventors: Sun-Ju Song, Orland Park, IL (US); Tae H. Lee, Naperville, IL (US); Ling Chen, Woodridge, IL (US); Stephen E. Dorris, LaGrange Park, IL (US); Uthamalingam Balachandran, Hinsdale, IL (US)

(73) Assignee: UChicago Argonne, LLC, Chicago, IL (US)

( * ) Notice: Subject to any disclaimer, the term of this patent is extended or adjusted under 35 U.S.C. 154(b) by 168 days.

(21) Appl. No.: 11/418,957

(22) Filed: May 5, 2006

(65) Prior Publication Data

US 2007/0270301 A1  Nov. 22, 2007

Related U.S. Application Data

(60) Provisional application No. 60/711,963, filed on Aug. 25, 2005, provisional application No. 60/711,962, filed on Aug. 25, 2005, provisional application No. 60/711,961, filed on Aug. 25, 2005.

(51) Int. Cl.
  *B28B 3/00* (2006.01)
  *B01D 53/22* (2006.01)
(52) U.S. Cl. .............................. 264/674; 264/676; 96/11
(58) Field of Classification Search ................. 264/674, 264/676; 96/11
   See application file for complete search history.

(56) References Cited

U.S. PATENT DOCUMENTS

| 3,350,846 | A  | * | 11/1967 | Makrides et al. ............... 95/56 |
| 5,447,559 | A  |   | 9/1995  | Rao et al. |
| 6,569,226 | B1 |   | 5/2003  | Dorris et al. |
| 6,726,893 | B2 |   | 4/2004  | Lee et al. |
| 2003/0183080 | A1 | * | 10/2003 | Mundschau .................... 95/55 |
| 2009/0000480 | A1 | * | 1/2009  | Dardas et al. .................. 96/11 |

OTHER PUBLICATIONS

Albers, Peter et al. "Reduction of Supported and Unsupported Palladium Oxide Catalysts using Methane". J. Chem. Soc. Faraday Trans., 1990, 86(21), 2671-2677.*

* cited by examiner

*Primary Examiner*—Carlos Lopez
*Assistant Examiner*—Russell J Kemmerle, III
(74) *Attorney, Agent, or Firm*—Olson & Cepuritis, Ltd.

(57) ABSTRACT

A thermal method of making a hydrogen permeable composition is disclosed. A mixture of metal oxide powder and ceramic oxide powder and optionally a pore former is formed and pressed to form an article. The article is dried at elevated temperatures and then sintered in a reducing atmosphere to provide a dense hydrogen permeable portion near the surface of the sintered mixture. The dense hydrogen permeable portion has a higher initial concentration of metal than the remainder of the sintered mixture and is present in the range of from about 20 to about 80 percent by volume of the dense hydrogen permeable portion.

14 Claims, 2 Drawing Sheets

THERMAL METHOD FOR FABRICATING A HYDROGEN SEPARATION MEMBRANE ON A POROUS SUBSTRATE

RELATED APPLICATIONS

This application, pursuant to 37 C.F.R. 1.78(C), claims priority based on provisional application Ser. Nos. 60/711,963 filed on Aug. 25, 2005, 60/711,962 filed Aug. 25, 2005 and 60/711,961 filed Aug. 25, 2005.

The object of this invention is to provide dense composite metal and ceramic membranes that can nongalvanically separate hydrogen from other gaseous components and is an improvement to the membranes and methods disclosed in U.S. Pat. No. 6,569,226, the entire disclosure of which is incorporated by reference.

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

FIELD OF THE INVENTION

This invention relates to a membrane and method for extracting hydrogen from fluids and, more particularly, this invention relates to a new method of making a high-flow rate membrane and an improved method for extracting hydrogen from fluid without using electrical power or circuitry.

BACKGROUND OF THE INVENTION

Global environmental concerns have ignited research to develop energy generation technologies which have minimal ecological damage. Concerns of global climate change are driving nations to develop electric power generation technologies and transportation technologies which reduce carbon dioxide emissions.

Hydrogen is considered the fuel of choice for both the electric power and transportation industries. While it is likely that renewable energy sources will ultimately be used to generate hydrogen, fossil-based technologies will be utilized to generate hydrogen in the near future.

The need to generate ever larger amounts of hydrogen is clear. Outside of direct coal liquefaction, other major industrial activities, such as petroleum refining, also require hydrogen. Collectively, petroleum refining and the production of ammonia and methanol consume approximately 95 percent of all deliberately manufactured hydrogen in the United States. As crude oil quality deteriorates, and as more stringent restrictions on sulfur, nitrogen and aromatics are imposed, the need for more hydrogen by the refining industry will increase.

Hydrogen production, as a consequence of other processes, is significant. A number of industries requiring hydrogen produce effluents containing significant amounts of unused hydrogen. However, this hydrogen requires clean-up prior to re-use. Furthermore, hydrogen is produced from the combustion of oil, methane, coal, and other petroleum-based materials. However, this hydrogen must be separated from other combustion gases, namely carbon dioxide, in order to be of use.

Petroleum refineries currently use cryogenics, pressure swing adsorption (PSA), and membrane systems for hydrogen recovery. However, each of these technologies has their limitations. For example, because of its high costs, cryogenics generally can be used only in large-scale facilities which can accommodate liquid hydrocarbon recovery. Membrane-based PSA systems require large pressure differentials across membranes during hydrogen diffusion. This calls for initial compression of the feed prior to contact to the upstream side of polymeric membranes and recompression of the permeate to facilitate final purification steps. Not only are these compression steps expensive, but PSA recovers less feedstream hydrogen and is limited to modest temperatures. U.S. Pat. No. 5,447,559 to Rao discloses a multi-phase (i.e. heterogenous) membrane system used in conjunction with PSA sweep gases.

The subject invention is an improvement of the '226 membranes providing an easier method of fabrication of the composite membranes.

SUMMARY OF THE INVENTION

It is a principal object of the present invention to provide a hydrogen-separation membrane and an improved method of making same.

Another general object of the invention is to provide a membrane to extract hydrogen from a variety of fluids in which the membrane is made by a thermal process hereinafter described.

Another object of the invention is to provide a method of making a hydrogen permeable composition, comprising forming a mixture of metal oxide powder and ceramic oxide powder and optionally a pore former, pressing the mixture to form an article, drying the article at elevated temperatures to remove at least some of the pore former if present and thereafter sintering in a reducing atmosphere to provide a dense hydrogen permeable portion near the surface of the sintered mixture, the dense hydrogen permeable portion having a higher initial concentration of metal than the remainder of the sintered mixture, the metal oxide being selected from the oxides of Ni, Pd, Pd alloys, Nb, Ta, Zr, V or mixtures thereof, the ceramic oxide part being selected from yttria stabilized zirconia, shrinkable alumina, suitably doped cerates, titanates, zirconates of barium or strontium or mixtures thereof, wherein the metal part is present in the range of from about 20 to about 80 percent by volume of the dense hydrogen permeable portion.

A final object of the invention is to provide a method of making a hydrogen permeable composition, comprising forming a mixture of metal oxide powder and ceramic oxide powder and a pore former, pressing the mixture to form an article, drying the article at elevated temperatures to remove at least some of the pore former and thereafter sintering in a hydrogen-containing reducing atmosphere to provide a dense hydrogen permeable portion not greater than about 50 microns in thickness and at least about 96% of theoretical density near the surface of the sintered mixture, the dense hydrogen permeable portion having a higher initial concentration of metal than the remainder of the sintered mixture, the metal oxide being selected from the oxides of Ni, Pd, Pd alloys, Nb, Ta, Zr, V or mixtures thereof, the ceramic oxide part being selected from yttria stabilized zirconia, shrinkable alumina, suitably doped cerates, titanates, zirconates of barium or strontium or mixtures thereof, wherein the metal part is present in the range of from about 20 to about 80 percent by volume of the dense hydrogen permeable portion.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION

Figure 1A:
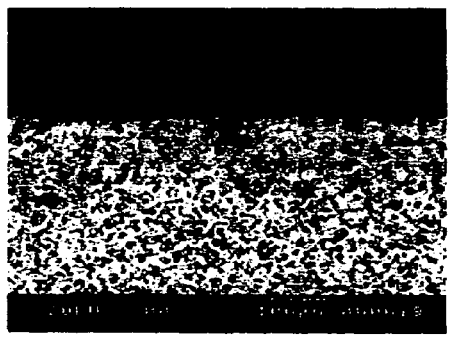
FIGS. 1(a) and (b) are SEM micrographs of dense ANL-1a film produced by the inventive method.
Figure 1B:
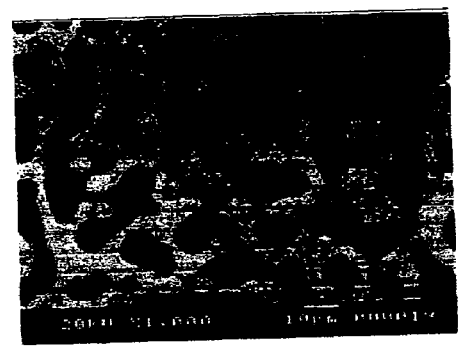

Argonne National Laboratory (ANL) is developing two types of novel ceramic membranes for producing pure hydrogen: hydrogen transport membranes (HTMs) and oxygen transport membranes (OTMs), see Table 1. Both types of membrane are dense and produce hydrogen nongalvanically, i.e., they require neither electrodes nor an external power supply. HTMs produce hydrogen by separating it from mixed gases, e.g., product streams generated during coal gasification and/or methane reforming, whereas OTMs generate hydrogen by removing oxygen that is produced during the dissociation of water at moderate temperatures (<900° C.).

| ANL Membrane Compositions | | |
|---|---|---|
| Membrane | Matrix | Metal |
| ANL - 0 | BCY | — |
| ANL - 0b | SFC(SrFeCo$_{0.5}$O$_x$) | — |
| ANL - 0c | SFT(Sr$_{1.0}$Fe$_{0.9}$Ti$_{0.1}$O$_x$) | — |
| ANL - 1a | BCY | Ni |
| ANL - 1b | CMO | Ni |
| ANL - 1c | TZ-8Y | Ni |
| ANL - 1d | SFT(Sr$_{1.0}$Fe$_{0.9}$Ti$_{0.1}$O$_x$) | Ni |
| ANL - 2a | BCY | Pd |
| ANL - 2b | CMO | Pd/Ag(23 wt. %) |
| ANL - 3a | Al$_2$O$_3$ | Pd |
| ANL - 3b | BaTiO$_3$ | Pd/Ag |
| ANL - 3c | Al$_2$O$_3$ | Nb |
| ANL - 3d | Al$_2$O$_3$ | Pd/Ag(23 wt. %) |
| ANL - 3e | TZ-3Y | Pd |
| ANL - 3f | TZ-8Y | Pd |
| ANL - 3g | CaZrO$_3$ | Pd |
| ANL - 4a | Cu | Nb |

Notes:
BCY = BaCe$_{0.8}$Y$_{0.2}$O$_{3-\delta}$
CMO = Ce$_{1-x}$M$_x$O$_{2-\delta}$(M Gd, Y)
TZ-3Y = ZrO$_2$ (3 mol. % Y$_2$O$_3$)
TZ-8Y = ZrO$_2$ (8 mol. % Y$_2$O$_3$)

Because the hydrogen flux through ANL-3 HTMs appears to be limited by the diffusion of hydrogen through the bulk, reducing the membrane thickness is expected to increase the hydrogen flux, or allow the same flux at lower temperatures. To increase the hydrogen flux through ANL membranes and/or reduce their operating temperature, the inventive thermal process was used for fabricating dense membrane thin films.

For cermet hydrogen separation membranes with thickness greater than about 10 μm, the hydrogen flux is limited by the diffusion of hydrogen through the bulk. As a result, reducing the membrane thickness is expected to increase the hydrogen flux or allow the same flux at lower temperatures. Because very thin membranes are not strong, they need mechanical support from a relatively thick substrate. In order for gases to flow to and from the membrane, the substrate must be porous, while the thin membrane must be dense to provide high selectivity for hydrogen. This invention relates to a simple, cost-effective thermochemical method, for preparing a dense, thin film, cermet hydrogen separation membrane on a porous substrate.

The thermochemical method has produced dense Ni/BCY thin films (≈25 μm) on porous Ni/BCY, where BCY represents BaCe$_{0.8}$Y$_{0.2}$O$_{3-\delta}$. In this invention, the gas composition is carefully controlled during sintering so that kinetic limitations confine the reduction of NiO to the surface of a NiO/BCY compact. Because Ni/BCY densifies more readily than NiO/BCY, only the surface layer densifies. The interior of the compact remains NiO/BCY during sintering, and becomes porous when the NiO is subsequently reduced at a lower temperature. Because dense Ni/BCY thin films (or other combinations) can be produced without further wet chemical processing, the method is comparatively simple and is amenable to fabricating tubes with a dense Ni/BCY layer on either the interior or exterior surface.

To make ANL-1a thin films using the thermal method, BCY/NiO disks were prepared by mixing NiO, BCY, and graphite (5 wt. %) powders, and then uniaxially pressing the mixture into thin (1-2 mm) cylindrical disks (≈22 mm diameter). The disks were pre-sintered at 700° C. for 5 h in air to remove the graphite and provide the disks with some mechanical integrity and porosity. The disks were then sintered for 8-10 h at 1350-1425° C. in gases containing 200 ppm-4% H$_2$/balance N$_2$. The composition of the disks was controlled to give 45 vol. % Ni and 55 vol. % BCY after elimination of the graphite and reduction of the NiO.

FIGS. 1(a) and (b) shows cross-sectional views of a BCY/NiO compact that was sintered at 1400° C. for 8 h in 200 ppm H$_2$/balance N$_2$. This first attempt to fabricate an ANL-1a thin film by the thermal method produced a dense layer with a thickness of ≈50 μm. Because the thickness of the dense layer depends on the relative rates of sintering and NiO-reduction, it is controlled by parameters such as the sintering temperature, ramp rate to the sintering temperature, oxygen partial pressure during sintering, and porosity of the compact.

The thickness of the dense layer depends on the relative rates of sintering and NiO reduction, therefore it should be influenced by parameters such as the sintering temperature, ramp rate to the sintering temperature, oxygen partial pressure during sintering, and porosity of the compact.

Figure 2A:
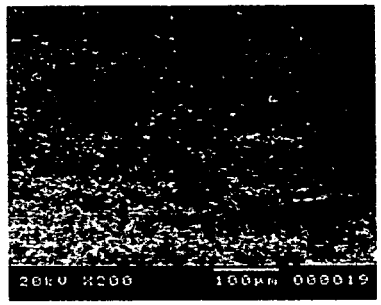
FIGS. 2(a)-(c) are SEMs of ANL 1a film reduced and sintered in different conditions.
Figure 2B:
Figure 2C:
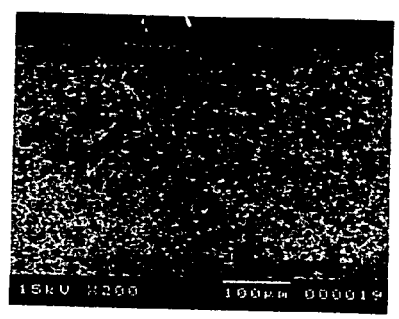

To study the parameters that affect the thickness of films made by the thermal method, ANL-1a films were made using three different heating schedules. Fracture surfaces of the films are shown in FIG. 2. In all cases, the atmosphere was 200 ppm H$_2$/balance N$_2$ during sintering. A film thickness of ≈100 μm (FIG. 2a) resulted when a sample was sintered at 1420° C. without first being reduced in 4% H$_2$. Reducing a sample at 1400° C. in 4% H2/balance N$_2$ for 0.1 h before it was sintered at 1400° C. decreased the film thickness to 33 μm (FIG. 2b), whereas reducing a sample at 500° C. in 4% H$_2$ for 0.1 h before it was sintered at 1400° C. decreased the film thickness to ≈25 μm (FIG. 2c). These results demonstrate that the film thickness can be manipulated by adjusting the conditions for heat-treating the BCY/NiO disks. For samples that were reduced before they were sintered, it was found that the film thickness increased with an increase in either the duration or the temperature of the reduction step.

Porous substrates on which the powder mixtures can be deposited, if desired, were made from either Al$_2$O$_3$ or a NiO/TZ-3Y mixture. Any of these ceramic oxide powders can be mixed with metal oxide powders to provide a homogeneous mixture, if desired. Preferably, a homogeneous mixture of metal oxide and ceramic oxide powders are used to make the cermets, but the invention includes a porous ceramic substrate onto which is pressed a homogeneous mixture. Two types of $Al_2O_3$ powder were tested and eliminated from further consideration, because one powder densified completely during sintering, and the other powder did not shrink during sintering. Low shrinkage of the substrate during sintering is a problem, because it hinders densification of the thin film. A third type of $Al_2O_3$ powder contained about 10 wt. % water, and experienced high shrinkage during sintering of the ANL-3e film that was deposited on it. The high shrinkage of the substrate was considered beneficial to densification of the thin film.

Sr—Fe—Co—O (SFC) powder for ANL-0b membranes was purchased from Praxair, whereas Sr—Fe—Ti—O (SFT) powder for ANL-1d membranes was prepared at ANL by conventional solid-state reaction between its constituent oxides. Disk-shaped membranes were prepared by uniaxially pressing the powders, heating to temperatures below 1000° C. and then sintering the disks in a variety of reducing atmospheres, depending on the constituents used, and under a variety of conditions of temperatures and times.

Hydrogen flux measurements during reduction of the substrate in a companion application suggest that the effect of sintering temperature on hydrogen flux might be related to the size of pores in the substrate. Because porosity increased during reduction and improved hydrogen transport through the substrate, the hydrogen flux increased with time until the substrate was fully reduced, at which point the flux stopped increasing. Films sintered at 1500° C were reduced in 3 h, whereas the film sintered at 1400° C. needed 12 h to be reduced. Because interconnected pores in the substrate aid reduction of NiO, the longer time to reduce the film sintered at 1400° C. suggests that it had either lower porosity, or smaller pores, than films sintered at 1500° C. Films sintered at a lower temperature should not be less porous than films sintered at a higher temperature, but sintering at a lower temperature could yield smaller grains of NiO, which would produce smaller pores after the NiO was reduced. Smaller pores could impede hydrogen transport through the substrate and could cause concentration polarization due to inefficient removal of the retentate from the pores.

An important feature of the present invention is that with the thermal method, it is possible to provide two different materials that have coefficients of expansion which are relatively close, it being preferred that the coefficient for the expansion of the membrane be less than about 10% different than for the substrate. Preferably, the ceramic substrate and the ceramic oxide portion of the membrane are the same or substantially the same. While there are a variety of metals which are useful as the metal oxide powder part of the hydrogen permeable membrane such as Ni, Pd, Pd alloys, Nb, Ta, Zr, V or various mixtures thereof, the preferred metal oxides are NiO or the oxides of Pd or a Pd—Ag alloy or mixture thereof. Moreover, the ceramic oxide may be a variety of materials, for instance yttria stabilized zirconia, shrinkable alumina, suitably doped cerates, titanate or zirconates of barium or strontium and mixtures thereof but the preferred oxide is the yttria stabilized zirconia or suitably doped barium-cerium-yttrium oxide. Where alumina is used, the alumina should be capable of shrinking upon sintering in air and to this end, an alumina with about 10% water has been found particularly satisfactory.

It has been shown that the method of producing hydrogen transfer membranes according to the inventive method produces superior hydrogen transport where the metal powder in the two-part membrane is present in the range from about 20 to about 80% by volume. Obviously, the greater the hydrogen concentration gradient across the membrane the more improved the flux will be for a given temperature pressure and other conditions.

Also as disclosed in the companion application, improved oxygen permeable membranes have been prepared utilizing those compounds previously identified as water splitting compounds in U.S. Pat. No. 6,726,893 issued Apr. 27, 2004, the entire disclosure of which is herein incorporated by reference. The oxygen transfer membranes operate by water splitting when water comes in contact with the surface of the membrane and is disassociated into hydrogen atoms and oxygen atoms with the oxygen atoms passing through the membrane leaving the hydrogen atoms on the original side. As is well known, thermodynamics insures that water splitting continues under these circumstances, thereby increasing hydrogen concentration. Both one part or two part membranes are capable of being manufactured by the method herein described. For one-part membrane, the oxygen permeable composition is one or a mixture of $Sr(Fe_{1-y}Co_y)O_x$ or $Sr(Fe1-yTi_y)O_x$. The oxygen permeable composition may also be formed of a two part membrane in which a metal oxide powder part is selected from Ni, Ag, or Fe or alloys or mixtures thereof with Ni oxide being preferred while the oxide part may be selected from $CeO_2$ doped with lower valence atoms, Gd being preferred or Zr being doped with a lower valence atoms usually from the lanthanides, or a $SrFeCo_{0.5}O_x$ or various mixtures thereof. These membranes can be made very thin, also less than about 20 microns and preferably less than about 10 microns and exhibit good if not superior oxygen permeability.

In the inventive thermal method, the metal oxide at the surface of the cermet (or other shape) is reduced initially to form a dense hydrogen permeable portion (or oxygen permeable portion for water splitting), which becomes thicker upon variation in reduction conditions or extended time in the reducing atmosphere. When a hydrogen permeable membrane is in use, and is exposed to a hydrogen containing atmosphere for a long period of time, metal oxide in the interior of the membrane converts by reduction to metal, but due to the use, preferably but not necessarily, of pore formers sufficient porosity remains for the construction to be permeable.

Pore formers which are acceptable are any material which vaporizes at temperatures below the sintering temperature, usually up to about 1000° C. Preferred pore formers are graphite or organic grains such as rice, but corn starch, glass beads, etc. are acceptable. Reducing atmospheres can be a wide variety and composition of gases, but for simplicity, hydrogen is preferred, and if a diluent is used, nitrogen is preferred.

The oxide (metal and ceramic) powders preferably have average diameters in the range of from about 0.1 to about 5 microns and most preferably about 0.1 to about 1 micron. The metal portion of the construction should be denser than the non-metallic portion of the construction after sintering, at least about 96% of theoretical density and most preferably at least about 98%. While all of the ceramic oxides in Table 1 are acceptable, the preferred are BCY or YSZ.

While the invention has been particularly shown and described with reference to a preferred embodiment hereof, it will be understood by those skilled in the art that several changes in form and detail may be made without departing from the spirit and scope of the invention.

The embodiments of the invention in which an exclusive property or privilege is claimed are defined as follows:

1. A method of making a hydrogen permeable composition, comprising forming a mixture of metal oxide powder and ceramic oxide powder and optionally a pore former, pressing the mixture to form an article, pre-sintering the article at about 700° C. in air to remove at least some of the pore former if present and to impart mechanical integrity and porosity to the article, and thereafter providing a dense hydrogen permeable portion near the surface of the sintered mixture and a porous core having a lower density relative to the dense surface layer by sintering the article in a reducing atmosphere comprising hydrogen to reduce metal oxide near the surface of the article to a metal and leave metal oxide in the core of the article, the dense hydrogen permeable portion having a higher initial concentration of metal than the remainder of the sintered mixture, the metal oxide being selected from the oxides of Ni, Pd, Pd alloys, Nb, Ta, Zr, V or mixtures thereof, the ceramic oxide being selected from yttria stabilized zirconia, shrinkable alumina, Y or Gd doped cerates, titanates, zirconates of barium or strontium or mixtures thereof, wherein the dense hydrogen permeable portion has a metal concentration in the range of from about 20 to about 80 percent by volume.

2. The method of claim 1, wherein the pore former is selected from graphite, corn starch, organic grains, glass beads or mixtures thereof.

3. The method of claim 1, wherein the reducing atmosphere includes nitrogen.

4. The method of claim 1, wherein the average diameters of the powders are in the range of from about 0.1 to about 5 microns.

5. The method of claim 4, wherein the average diameters of the powders are in the range of from about 0.1 to about 1 micron.

6. The method of claim 1, wherein the dense hydrogen permeable portion of composition is at least about 96% of theoretical density.

7. The method of claim 1, wherein the metal oxide powder is selected from the oxides of Ni, Pd, Pd alloys, and mixtures thereof.

8. The method of claim 1, wherein the ceramic oxide powder is selected from yttria stabilized zirconia, Y or Gd doped cerates of barium or strontium or mixtures thereof.

9. The method of claim 1, wherein the metal oxide powder is selected from the oxides of Ni, Pd, Pd alloys and mixtures thereof and the ceramic oxide powder is selected from yttria stabilized zirconia, Y or Gd doped cerates of barium or strontium and mixtures thereof.

10. The method of claim 1, wherein the coefficients of thermal expansion of the dense hydrogen permeable portion and the remainder of the composition are within about 10% of each other.

11. A method of making a hydrogen permeable composition, comprising forming a mixture of metal oxide powder and ceramic oxide powder and a pore former, pressing the mixture to form an article, pre-sintering the article at about 700° C. in air to remove at least some of the pore former if present and to impart mechanical integrity and porosity to the article, and thereafter providing a dense hydrogen permeable portion near the surface of the sintered mixture and a porous core having a lower density relative to the dense surface layer by sintering the article in a reducing atmosphere comprising hydrogen to reduce metal oxide near the surface of the article to a metal and leave metal oxide in the core of the article, the dense hydrogen permeable portion having a higher initial concentration of metal than the remainder of the sintered mixture, the metal oxide being selected from the oxides of Ni, Pd, Pd alloys, Nb, Ta, Zr, V or mixtures thereof, the ceramic oxide being selected from yttria stabilized zirconia, shrinkable alumina, Y or Gd doped cerates, titanates, zirconates of barium or strontium or mixtures thereof, wherein the dense hydrogen permeable portion has a metal concentration in the range of from about 20 to about 80 percent by volume.

12. The method of claim 11, wherein the sintering takes place at temperatures greater than about 1000° C.

13. The method of claim 12, wherein at least some of the sintering takes place at a temperature greater than about 1400° C.

14. The method of claim 11, wherein the pore former is vaporizable at temperatures less than about 1000° C.

* * * * *